US012596606B2

(12) United States Patent
Bailey et al.

(10) Patent No.: US 12,596,606 B2
(45) Date of Patent: Apr. 7, 2026

(54) FILE PATH TRACING AND BEHAVIORAL REMEDIATION ON PATH REVISION

(71) Applicant: International Business Machines Corporation, Armonk, NY (US)

(72) Inventors: Logan Bailey, Atlanta, GA (US); Melanie Dauber, Oceanside, NY (US); Zachary A. Silverstein, Georgetown, TX (US); Jacob Ryan Jepperson, St. Paul, MN (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 18/588,047

(22) Filed: Feb. 27, 2024

(65) Prior Publication Data

US 2025/0272184 A1 Aug. 28, 2025

(51) Int. Cl.
*G06F 11/00* (2006.01)
*G06F 11/07* (2006.01)
*G06F 16/17* (2019.01)

(52) U.S. Cl.
CPC ...... *G06F 11/0793* (2013.01); *G06F 11/0727* (2013.01); *G06F 16/1734* (2019.01)

(58) Field of Classification Search
CPC ............. G06F 11/0793; G06F 11/0727; G06F 16/1734
USPC ...................................................... 714/1–57
See application file for complete search history.

(56) References Cited

U.S. PATENT DOCUMENTS

| | | | |
|---|---|---|---|
| 6,983,296 B1 | 1/2006 | Muhlestein | |
| 8,332,690 B1 * | 12/2012 | Banerjee | G06F 11/0727 714/26 |
| 9,292,529 B2 | 3/2016 | Subramanya | |
| 9,390,109 B2 | 7/2016 | Pawar | |
| 9,852,148 B2 | 12/2017 | Fan | |
| 10,198,451 B2 | 2/2019 | Prahlad | |
| 10,599,671 B2 | 3/2020 | Dorman | |
| 11,029,838 B2 | 6/2021 | Lemay | |
| 2005/0160313 A1 * | 7/2005 | Wu | G06F 11/2056 714/13 |

(Continued)

FOREIGN PATENT DOCUMENTS

| | | |
|---|---|---|
| CN | 112559019 A | 3/2021 |
| CN | 112527388 B | 10/2022 |
| CN | 115146266 A | 10/2022 |

OTHER PUBLICATIONS

"IBM Cognos Analytics", IBM, downloaded from the Internet Dec. 18, 2023, 14 pages, https://www.ibm.com/products/cognos-analytics?Ink=hpmps_bupr.

(Continued)

*Primary Examiner* — Sarai E Butler

(74) *Attorney, Agent, or Firm* — Monchai Chuaychoo

(57) ABSTRACT

Embodiments of the present invention provide computer-implemented methods, computer program product, and computer systems. One or more processors can monitor file revision history of a filesystem. The one or more processors generate a remedial action based on previous user interaction behavior in response to detecting a failed interaction with a file in the filesystem. The one or more processors execute the remedial action that retrieves the file.

20 Claims, 4 Drawing Sheets

(56)                References Cited

U.S. PATENT DOCUMENTS

2008/0007763  A1 *   1/2008   Markel ................. G06F 9/5027
                                                           358/1.15
2009/0070627  A1 *   3/2009   Lohn ................... G06F 11/0793
                                                           714/15
2009/0249119  A1 *   10/2009  Sethumadhavan ........................
                                                       G06F 11/1469
                                                           714/15
2010/0250681  A1 *   9/2010   Van Wely .............. H04L 51/23
                                                           709/206
2011/0113287  A1 *   5/2011   Gururaj .............. G06F 11/0706
                                                           714/E11.029
2011/0225451  A1 *   9/2011   Leggette ................ H04L 63/10
                                                           714/E11.088
2012/0151250  A1 *   6/2012   Saika ................... G06F 16/185
                                                           714/E11.073
2013/0073914  A1 *   3/2013   Kaul ................... G06F 12/0253
                                                           711/170

2014/0281227  A1 *   9/2014   Herron ................. G06F 3/0631
                                                           711/117
2014/0372798  A1 *   12/2014  Chang ................... G11B 27/36
                                                           714/15
2015/0363254  A1 *   12/2015  Satoyama .......... G06F 11/0727
                                                           714/57
2015/0378859  A1 *   12/2015  Jang ..................... G06F 11/263
                                                           714/41
2018/0011874  A1      1/2018  Lacapra
2018/0307524  A1 *   10/2018  Vyas ................... G06F 9/45504
2019/0391739  A1 *   12/2019  Mueller .............. G06F 11/1451
2021/0334254  A1 *   10/2021  Thompson ....... G06Q 10/06315
2022/0382653  A1 *   12/2022  Furuhashi .............. G06F 16/13

OTHER PUBLICATIONS

"IBM FileNet Content Manager", IBM, downloaded from the Internet Dec. 18, 2023, 13 pages, https://www.ibm.com/products/filenet-content-manager.

* cited by examiner

FILE PATH TRACING AND BEHAVIORAL REMEDIATION ON PATH REVISION

BACKGROUND

The present invention relates generally to content management, and more particularly to file path tracing of content.

Content management typically refers to a set of processes and technologies that support collection and management of information. Digital content refers to stored information (e.g., text, image, multimedia files, etc.) on one or more computer systems. Management of digital content can use set of automated processes that may support import and creation of documents and multimedia material, identification of all key users and their roles, the ability to assign roles and responsibilities to different instances of content categories or types. Workflow tasks can include messaging so that content managers are alerted to changes in content, the ability to track and manage multiple versions of a single instance of content, the ability to publish the content to a repository to support access, and the ability to personalize content based on a set of rules.

SUMMARY

According to an aspect of the present invention, there is provided a computer-implemented method, a computer program product, and a computer system. The computer-implemented method includes monitoring file revision history of a filesystem; in response to detecting a failed interaction with a file in the filesystem, generating a remedial action based on previous user interaction behavior, and executing the remedial action that retrieves the file.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that digital content management have certain inefficiencies. Typically, management of digital content relies on locating and retrieving stored files. In some instances, changes to a location of a file (i.e., file path) can result in computing inefficiencies (e.g., inability to locate a file and proceed processing) that could prevent proper functioning of systems. Embodiments of the present invention provide solutions for content storage location modification based on user awareness, notification, and linkage between the old and new file path for ease of access. Embodiments of the present invention provide these solutions by automatically monitoring file paths and remediating potential problems caused by changes to file paths. Specifically, embodiments of the present invention derive a declared path selection criteria based on user behavior for file relocation, renaming, and deletion pertaining to a locally utilized machine as discussed in greater detail later in this Specification. In this manner, embodiments of the present invention improve file structure management and usage of file management for a locally owned and operated device based on the user's ability to locate a specified file.

Figure 1:
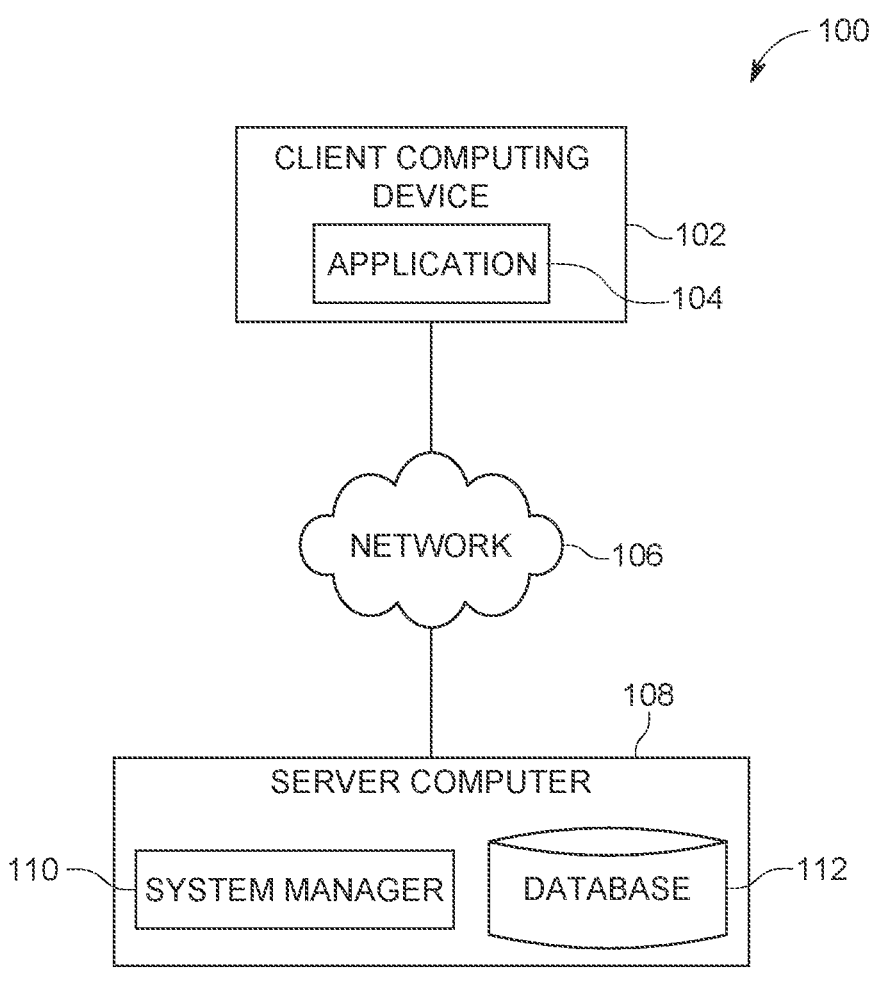
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108 interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access system manager 110 (e.g., using TCP/IP) to access user information and database information. In this embodiment, application 104 receives permissioned access to user information and database. For example, application 104 can provide a user an opt-in/opt-out notification before accessing user information and database information. Application 104 can further communicate with system manager 110 to continuously monitor and record changes to file path, as discussed in greater detail in FIGS. 2-4. In this embodiment, client computing device 102 can be used to monitor and record changes to file paths of one or more files in other computing systems.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts system manager 110 and database 112. In this embodiment, system manager 110 resides on server computer 108. In other embodiments, system manager 110 can have an instance of the program (not shown) stored locally on client computing device 102. In other embodiments, system manager 110 can be a standalone program or system that can be integrated in one or more computing devices having a display screen.

In those embodiments, where system manager 110 is stored locally on client computing device 102, system manager 110 provides capabilities for file management on a locally owned and operated device based on the user's ability to locate a given file. More specifically, system manager 110 derives a declared path selection criteria that aligns to the user behavior for file relocation, reaming, and deletion. System manager 110 provides this capability by automatically linking a new file path to the old file path (i.e., previous file path). In some embodiments, system manager 110 can then notify the user when the user visits the old directory that the file the user may be looking for has been moved to a new directory. In those embodiments, system manager 110 can automatically generate a temporary file in the previous location that syncs with the original file in the new location so that content can be found and accessed from various locations, while still maintaining a single repository and source of truth. For example, system manager 110 can notify the user that the file was moved to a new location and temporarily link the old directory and new directory together in instances when a user navigates to a folder expecting to find a file, but it no longer existed in that location (e.g., the link to the file in the user's recent files folder was broken).

In this embodiment, system manager 110 triggers file path linkages to a revision in dependent locations based on the user's knowledge and filesystem navigation behavior. For example, system manager 110 can guide a user to the revised file's location based on the user's knowledge of where the file used to be. More specifically, system manager 110 can utilize past user behavior (i.e., interactions) with a file (e.g., previous file path navigations) to determine what file the user may be looking for, link the previous location of the file to the new location of the file, and automatically navigate the user to the file's new location. System manager 110 guides a user to the revised file's location by continuously monitoring user behavior, associating user actions (e.g., file movement, renaming, nest fold behavior and other file system manipulation, etc.) with a respective file, and storing those user actions. In response to determining a failed user interaction to navigate to a file (e.g., a user navigates to a previous file path location), system manager 110 can navigate the user to the file's new location. In certain embodiments, system manager 110 can further automatically update dependent applications based on the user's actions.

In embodiments where system manager 110 updates the file path instances and dependencies, system manager 110 can detect and update a file's file path within the systems registry. System manager 110 can also detect and update the file path within cache. In some embodiments, system manager 110 can detect and update file path dependencies in software applications.

In certain embodiments, system manager 110 can monitor for incorrect navigation attempts to a folder or old file location and take remedial action to guide the user to the new location. In other words, in response to detecting an attempt to open a previously altered file path, system manager 110 can generate an alert that details changes to that file's file path and provide the updated (i.e., correct) new file path location. For example, when a user opens a deprecated path, system manager 110 can automatically return the new file's location after identifying the root file. In other embodiments, in response to detecting an attempt to open a previously altered file path, system manager 110 can auto correct the old file path, suggest the new file path, and execute and retrieve the file. In yet other embodiments, system manager 110 can automatically redirect to the new file path by generating a shortcut link that exists at the old location which, in response to the user selecting that shortcut, navigate the user to the new file path location.

In some embodiments, system manager 110 stores a time controlled temporary file containing notice of file path change at the preexisting file path location. For example, system manager 110 can persisting a linkage to the new file path location for a period of one week. In other embodiments, system manager 110 can be configured to persist a location at the previous (i.e., preexisting) file path location for any suitable time period.

In other embodiments, system manager 110 can be implemented within a cloud-based system for one or more users. For example, system manager 110 can link changes made by one user and apply file changes made by that one user to additional users within a group which can reduce errors with shared documentation for development, testing, deployment, etc.

In this embodiment, system manager 110 provides capabilities for file management based on the user's ability to locate a given file when a user gives permissioned access to monitor user information and file revision history. System manager 110 can then monitor user interaction with the system. In this manner, system manager 110 can detect file name changes, changes to the file path, or deletion of the file.

Figure 2:
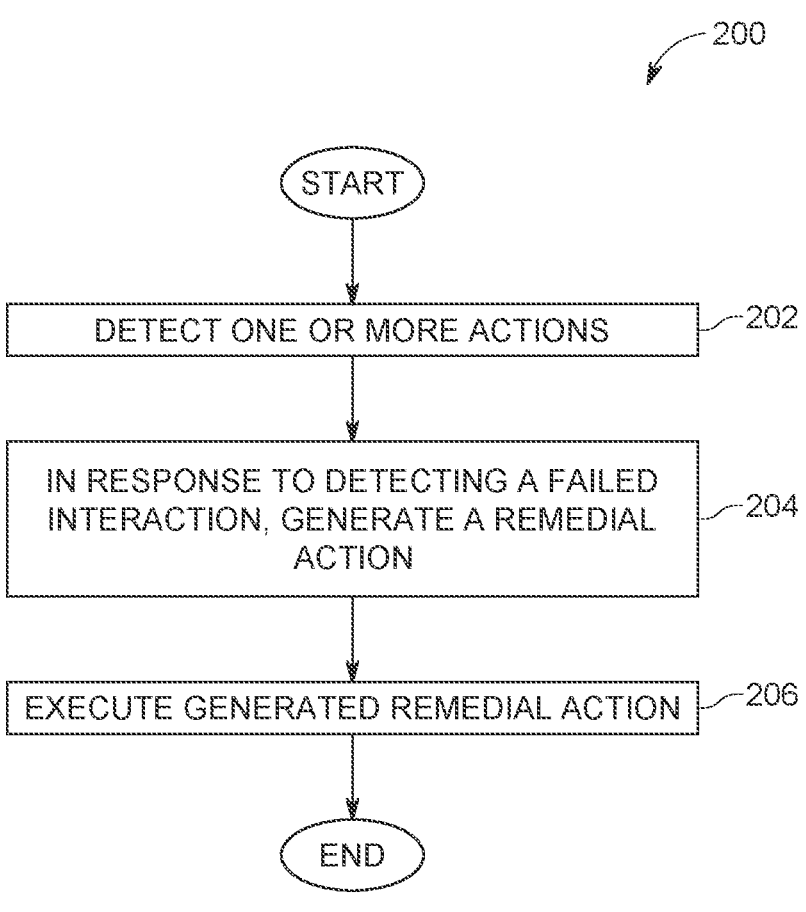
FIG. 2 is a flowchart depicting operational steps for executing file path remediation, in accordance with an embodiment of the present invention.
Figure 3:
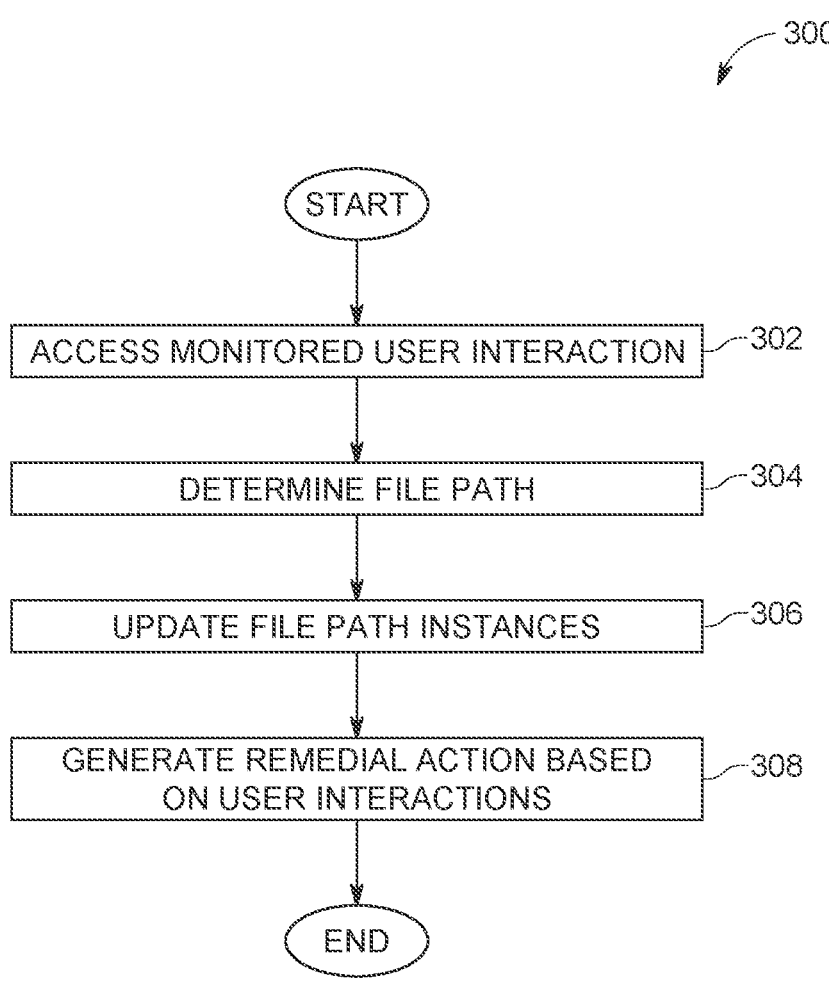
FIG. 3 is a flowchart depicting operational steps for generating a remedial action, in accordance with an embodiment of the present invention.

In response to detecting a user accessing an incorrect file path, system manager 110 can ingest the user attempt (i.e., navigation failure) and generate remedial actions based on recognized user interaction patterns as discussed in greater detail with regard to FIGS. 2 and 3. System manager 110 can then execute one or more generated remedial actions and navigate a user to the file path's new location.

Database 112 stores received information and can be representative of one or more databases that give permissioned access to system manager 110 or publicly available databases. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

FIG. 2 is a flowchart 200 depicting operational steps for reconciling desired states, in accordance with an embodiment of the present invention.

In step 202, system manager 110 detects one or more actions. In this embodiment, system manager 110 detects one or more actions a user takes with a file (i.e., file actions) by monitoring file revision history of a file system. A file action can include user interactions with a file within a file system. For example, a file action can include deletions, name changes, location changes, etc. In some embodiments, a file action can include user interactions that include attempts to navigate to a file (e.g., attempts made to navigate to a particular file path). Failed attempts to navigate to a file using an incorrect file path are also monitored by system manager 110 as well as successful attempts to navigate to a file using the correct (i.e., most current) file path. In some embodiments, system manager 110 can detect one or more actions by monitoring for any changes to a user's file navigation system on the operating system of the device. In other embodiments, system manager 110 can receive access to an operating system's file system and detect one or more changes to any file of the system. Changes to a file can include one or more modifications to a file, one or more relocations of the file, renaming the file, or deleting the file. By detecting one or more user interactions (i.e., file actions), system manager 110 can create a link between the file and the one or more interactions and contextualize the interactions a user has with the file. In some embodiments, system manager 110 can store this mapped information as a separate file that is linked with a file that the user is interacting with as well as the file path for that file. System manager 110 can then use this stored file to navigate to the file's current location, identify the file's previous locations, and previous user attempts to access the file (i.e., successful file navigation and failed file navigation).

In step 204, in response to detecting a failed file interaction, system manager 110, generates a remedial action. As used herein, a failed file interaction (also referred to as a failed file navigation or unsuccessful file navigation) refers to an unsuccessful attempt to access a file. For example, a failed file interaction can be the result of an invalid path request or any request that fails to retrieve a file that the user is looking for. In some instances, a failed file interaction can be the result of a typographical error made by the user. System manager 110 can also monitor user interactions for a specified period of time after a failed file interaction to confirm a failed file interaction. For example, system manager 110 can monitor and identify that the user navigates to an older folder where the file was previously stored and then navigates back to a new folder where the file currently exists (i.e., a valid file path containing the file). In this instance, system manager 110 can identify one failed file interaction (e.g., the interaction that navigated to the old folder) and one successful file interaction (e.g., the interaction that navigated the user to the new file folder containing the requested file). Other instances can include user search queries for an old file name and subsequent search actions for the new file name and or location.

In some embodiments, system manager 110 can monitor for a threshold number of attempts to identify a failed file interaction. For example, system manager 110 can monitor for three failed file interactions before generating a remedial action. In some other embodiments, system manager 110 can be configured to monitor for a threshold number attempts within a specified time period. For example, system manager 110 can monitor for a threshold number of attempts (e.g., three) within a specified time period (e.g., thirty seconds). System manager 110 can also monitor applications used by the user and actions taken on the application (e.g., where the application opens up a folder and navigates to and old location where the file does not exist). System manager 110 can then create a link between the file and interactions a user has previously had with the file and actions taken by the user after a failed file interaction. In this manner, system manager

110 can contextualize actions taken by the user and confirm a failed file interaction. In this embodiment, system manager 110 generates a remedial action by accessing monitored user interactions, determining the correct file path, updating file path instances, and generating a remedial action based on the monitored user interactions as discussed in greater detail with regard to FIG. 3.

In step 206, system manager 110 executes the generated remedial action. In this embodiment, system manager 110 executes the generated remedial action by navigating the user to the correct file path and retrieving the desired file. System manager 110 can then create a temporal agent so that support for the remediation is not infinite and is time locked based on the expected user interaction occurrence or frequency of navigation of the expected file.

FIG. 3 is a flowchart 300 depicting operational steps for generating a remedial action, in accordance with an embodiment of the present invention.

In step 302, system manager 110 accesses monitored user interaction. In this embodiment, system manager 110 accesses monitored user interaction by querying database 112. In this manner, system manager 110 can determine contextual information from a user's previous interaction with the file. For example, system manager 110 can identify user interactions for "File A" at "Location One" and has made a series of modifications to File A. System manager 110 can further identify that the most recent user interaction moved File A to "Location Two". In other embodiments, system manager 110 can be configured to automatically receive monitored user interactions stored on database 112 or on one or more other components of computing environment 100.

In step 304, system manager 110 determines file paths. In this embodiment, system manager 110 determines a file path of the file that the user attempted to retrieve from the monitored user interactions. Continuing the above example, system manager 110 can identify that the user has navigated to Location One, three times and is attempting to access File A. System manager 110 can then reference previous actions the user took that was linked with the file the user is attempting to access. For example, system manager 110 can then identify that File A has been moved to Location Two.

In instances where system manager 110 has been configured to monitor for a threshold number of attempts to navigate to a file path, system manager 110 can determine that the user attempted to navigate to the same invalid path three times. In instances where the threshold number of attempts is configured to three, system manager 110 can determine that the threshold number of attempts has been reached and take further action. In some embodiments, system manager 110 can include similar attempts to reach the same invalid file path. For example, system manager 110 can include typographical errors in the count for a threshold number of incorrect attempts to navigate to a file path. In certain other embodiments, system manager 110 can determine a threshold percentage for similarity to a previous file path (i.e., previous path of the file). For example, system manager 110 can determine that a user's current attempt to navigate to an invalid path has a 60% similar match to a previous file path for a given file the user is trying to access. In this way, system manager 110 can determine if the actions taken after a failed interaction were a singular move (i.e., a navigation error) or multiple attempts to access a file (i.e., repetitive actions or a renavigation action).

In step 306, system manager 110 updates file path instances. In this embodiment, system manager 110 updates file instances in response to determining whether file paths were a singular move or multiple attempts to access a file. In instances where a singular move was made, system manager 110 can discard the interaction, that is, system manager 110 does not update the file linked with the file path of the file that was being accessed. In instances where system manager 110 determines that multiple attempts were made to access the file, system manager 110 updates the file linked with the file path of the file that was being accessed. In this manner system manager 110 can update the file the user was attempting to access with previous file path information and create a link between the previous file path and the most current file path that navigates to the file the user attempted to access.

In step 308, system manager 110 generates remedial actions based on user interactions. A remedial action as used herein refers to one or more actions that retrieves a file a has attempted to access. A remedial action can include an alert that details changes to a respective file's file path and provide textual information (e.g., updated file path location) to the user. In other instances, a remedial action can include automatic navigation to and retrieval of the file. For example, when a user opens a deprecated path (e.g., a failed interaction), system manager 110 can automatically return the new file's location after identifying the root file. In other embodiments, a remedial action can include autocorrection or textual suggestions for the new file path that when accessed, retrieves the file. For example, in response to detecting an attempt to open a previously altered file path, system manager 110 can auto correct the old file path, suggest the new file path, and execute and retrieve the file. A remedial action can also include generation of a shortcut icon in the folder the file was previously stored that, when selected, automatically redirects a user using the new file path to the new (i.e., updated) folder where the file is stored. For example, system manager 110 can automatically redirect to the new file path by generating a shortcut link that exists at the old location which, in response to the user selecting that shortcut, navigate the user to the new file path location.

Figure 4:
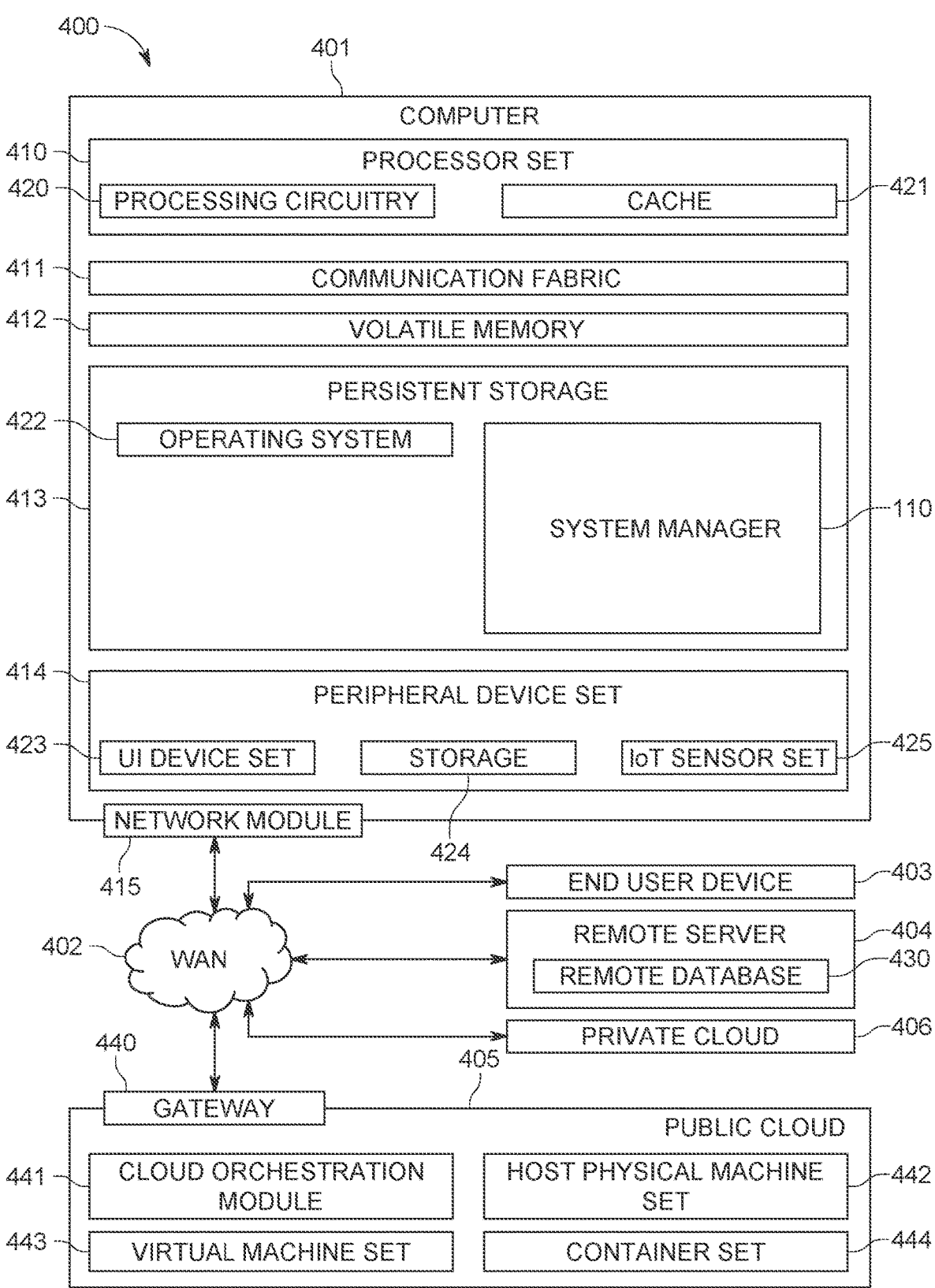
FIG. 4 is a block diagram of an alternate computing environment, in accordance with an embodiment of the present invention.

FIG. 4 depicts an alternate block diagram of components of computing systems within computing environment 100 of FIG. 1, in accordance with an embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code involved in performing the inventive methods, such as system manager 110 (also referred to as block 110) which continuously reconciles desired states and provides polymorphous intent-based management as discussed previously with respect to FIGS. 2-3.

In addition to block 110, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 110, as identified above), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 110 in persistent storage 413.

COMMUNICATION FABRIC 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface type operating systems that employ a kernel. The code included in block 110 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

What is claimed is:

1. A computer-implemented method comprising:
monitoring file revision history of a file system;
detecting one or more user interactions with files of the file system, wherein the one or more user interactions comprise of a successful interaction and a failed interaction;
in response to detecting the failed interaction with a file in the file system, notifying one or more users that the file no longer exists in a previous saved location and generating a remedial action based on previous user interaction behavior, wherein the previous user interaction behavior is based on a past behavior interaction with the file of a user which includes, at least, a file movement by the user, and a nest fold behavior by the user and wherein generating the remedial action further comprising:
in response to detecting one or more user interactions, accessing monitored user interactions with the file, wherein the one or more user interactions consisting of the successful interaction;
determining file paths associated with the file and previous file interactions of the file; and
retrieving the file; and
executing the remedial action that retrieves the file based on an updated new file path location.

2. The computer-implemented method of claim 1, the past behavior interaction with the file of a user includes file relocation, file renaming and deletion of files.

3. The computer-implemented method of claim 1, further comprising:
monitoring user interactions with one or more files within the file system; and
creating links between respective user interactions with a respective file.

4. The computer-implemented method of claim 1, further comprising:
determining whether user actions taken after a failed interactions were singular or repetitive; and
storing repetitive user interactions for a specified time period in response to detecting a failed interaction with a file in the file system.

5. The computer-implemented method of claim 1, the remedial action comprises storing a temporary file containing an updated path to the file at a previous path of the file.

6. The computer-implemented method of claim 1, further comprising:
sending a user attempting to access the file a notice of change message comprising a correct path.

7. The computer-implemented method of claim 1, wherein the remedial action comprises auto-correcting an invalid path to the file to a valid path to the file.

8. The computer-implemented method of claim 1, wherein the remedial action comprises updating a file path of the file within a registry, updating the file path within a cache, and updating the file path within an application.

9. A computer program product comprising:

one or more computer readable storage media and program instructions stored on the one or more computer readable storage media, the program instructions comprising:

program instructions to monitor file revision history of a file system;

program instructions to detect one or more user interactions with files of the file system, wherein the one or more user interactions comprise of a successful interaction and a failed interaction;

in response to program instructions to detect the failed interaction with a file in the file system, program instructions to notify one or more users that the file no longer exists in a previous saved location and program instructions to generate a remedial action based on previous user interaction behavior, wherein the previous user interaction behavior is based on a past behavior interaction with the file of a user which includes, at least, a file movement by the user, and a nest fold behavior by the user and wherein generating the remedial action further comprising:

in response to detecting one or more user interactions, program instructions to access monitored user interactions with the file, wherein the one or more user interactions consisting of the successful interaction;

program instructions to determine file paths associated with the file and previous file interactions of the file; and program instructions to retrieve the file; and program instructions to execute the remedial action that retrieves the file based on an updated new file path location.

10. The computer program product of claim 9, the past behavior interaction with the file of a user includes file relocation, file renaming and deletion of files.

11. The computer program product of claim 9, wherein the program instructions stored on the one or more computer readable storage media further comprise:

program instructions to monitor user interactions with one or more files within the file system; and program instructions to create links between respective user interactions with a respective file.

12. The computer program product of claim 9, wherein the program instructions stored on the one or more computer readable storage media further comprise:

program instructions to determine whether user actions taken after a failed interactions were singular or repetitive; and program instructions to store repetitive user interactions for a specified time period in response to detecting a failed interaction with a file in the file system.

13. The computer program product of claim 9, the remedial action comprises program instructions to store a temporary file containing an updated path to the file at a previous path of the file.

14. The computer program product of claim 9, wherein the program instructions stored on the one or more computer readable storage media further comprise:

program instructions to send a user attempting to access the file a notice of change message comprising a correct path.

15. The computer program product of claim 9, wherein the remedial action comprises program instructions to auto-correct an invalid path to the file to a valid path to the file.

16. The computer program product of claim 9, wherein the remedial action comprises program instructions to update a file path of the file within a registry, updating the file path within a cache, and updating the file path within an application.

17. A computer system comprising:

one or more computer processors;

one or more computer readable storage media; and program instructions stored on the one or more computer readable storage media for execution by at least one of the one or more computer processors, the program instructions comprising:

program instructions to monitor file revision history of a file system;

program instructions to detect one or more user interactions with files of the file system, wherein the one or more user interactions comprise of a successful interaction and a failed interaction;

in response to program instructions to detect the failed interaction with a file in the file system, program instructions to notify one or more users that the file no longer exists in a previous saved location and program instructions to generate a remedial action based on previous user interaction behavior, wherein the previous user interaction behavior is based on a past behavior interaction with the file of a user which includes, at least, a file movement by the user, and a nest fold behavior by the user and wherein generating the remedial action further comprising:

in response to detecting one or more user interactions, program instructions to access monitored user interactions with the file, wherein the one or more user interactions consisting of the successful interaction;

program instructions to determine file paths associated with the file and previous file interactions of the file; and program instructions to retrieve the file; and program instructions to execute the remedial action that retrieves the file based on an updated new file path location.

18. The computer system of claim 17, the past behavior interaction with the file of a user includes file relocation, file renaming and deletion of files.

19. The computer system of claim 17, wherein the program instructions stored on the one or more computer readable storage media further comprise:

program instructions to monitor user interactions with one or more files within the file system; and program instructions to create links between respective user interactions with a respective file.

20. The computer system of claim 17, wherein the program instructions stored on the one or more computer readable storage media further comprise:

program instructions to determine whether user actions taken after a failed interactions were singular or repetitive; and program instructions to store repetitive user interactions for a specified time period in response to detecting a failed interaction with a file in the file system.

* * * * *